(12) United States Patent
Li

(10) Patent No.: US 9,544,964 B2
(45) Date of Patent: Jan. 10, 2017

(54) LIGHTING DEVICES EMPLOYING CLASS-E POWER AMPLIFIER FOR INDUCTIVE POWER AND DATA TRANSFER IN HIGH-MOISTURE OPERATING ENVIRONMENTS

(71) Applicant: S.R. Smith, LLC, Canby, OR (US)

(72) Inventor: Chuan Li, Fremont, CA (US)

(73) Assignee: S.R. Smith, LLC, Canby, OR (US)

( * ) Notice: Subject to any disclaimer, the term of this patent is extended or adjusted under 35 U.S.C. 154(b) by 0 days.

(21) Appl. No.: 15/143,381

(22) Filed: Apr. 29, 2016

(65) Prior Publication Data

US 2016/0323952 A1     Nov. 3, 2016

Related U.S. Application Data

(60) Provisional application No. 62/155,239, filed on Apr. 30, 2015.

(51) Int. Cl.
*H05B 37/02* (2006.01)
*H05B 33/08* (2006.01)
*F21V 31/00* (2006.01)

(52) U.S. Cl.
CPC ......... *H05B 33/0845* (2013.01); *F21V 31/005* (2013.01); *H02J 50/12* (2016.02); *H05B 33/0812* (2013.01); *H05B 33/0815* (2013.01); *H05B 33/0857* (2013.01); *H05B 37/0272* (2013.01)

(58) Field of Classification Search
CPC ............ H05B 33/0815; H05B 33/0812; H05B 33/0845; H05B 33/0857; H05B 37/0272; F21V 31/005

USPC ....................................................... 315/219
See application file for complete search history.

(56) References Cited

U.S. PATENT DOCUMENTS

| | | | |
|---|---|---|---|
| 6,529,127 B2 | 3/2003 | Townsend et al. | |
| 7,125,146 B2 | 10/2006 | Willis et al. | |
| 7,178,178 B2* | 2/2007 | Hutchings | H02J 5/005 4/496 |
| 8,030,851 B2 | 10/2011 | Vernondier et al. | |
| 8,471,687 B2 | 6/2013 | Steiner et al. | |
| 8,502,464 B2* | 8/2013 | Lakirovich | H05B 33/086 315/254 |
| 8,581,517 B2 | 11/2013 | Kuo et al. | |
| 2005/0007766 A1* | 1/2005 | Jigamian | F21L 4/005 362/157 |

(Continued)

FOREIGN PATENT DOCUMENTS

| | | |
|---|---|---|
| CN | 1134636 A | 10/1996 |
| CN | 201437940 U | 4/2010 |

(Continued)

OTHER PUBLICATIONS

BGB SILS, "BGB SILS Brochure.pdf," archived at https://web.archive.org/web/20141122090624/http://www.bgbinnovation.com/brochures/bgbsils_brochure_2014/, archived Dec. 4, 2014, 13 pages.

*Primary Examiner* — Don Le
(74) *Attorney, Agent, or Firm* — Stoel Rives LLP; Robert R. Teel

(57) ABSTRACT

An inductive-coupling lighting system for use in high-moisture operating environments provides electromagnetic inductive coupling for simultaneous wireless (contactless) transfer of power and lighting-control commands.

20 Claims, 10 Drawing Sheets

(56) References Cited

U.S. PATENT DOCUMENTS

| | | | |
|---|---|---|---|
| 2008/0048579 A1* | 2/2008 | Vernondier | H05B 33/0803 315/248 |
| 2009/0284164 A1* | 11/2009 | Ray | G09G 3/14 315/218 |
| 2012/0112531 A1* | 5/2012 | Kesler | B60L 11/182 307/9.1 |
| 2012/0222997 A1 | 9/2012 | Potucek et al. | |
| 2014/0036511 A1* | 2/2014 | Whitfield | F21V 27/005 362/311.02 |
| 2014/0203710 A1 | 7/2014 | Li | |

FOREIGN PATENT DOCUMENTS

| | | |
|---|---|---|
| DE | 20004069 U1 | 7/2000 |
| EP | 1147758 B1 | 10/2001 |
| FR | 2998104 A1 | 5/2014 |
| JP | 2002251901 A | 9/2002 |
| WO | 2014117481 A1 | 8/2014 |

\* cited by examiner

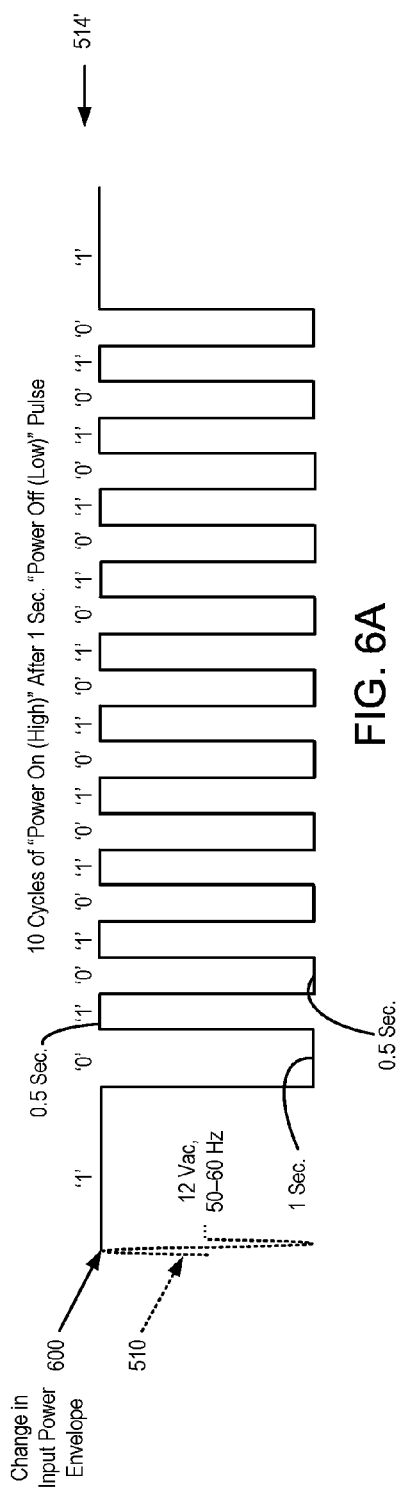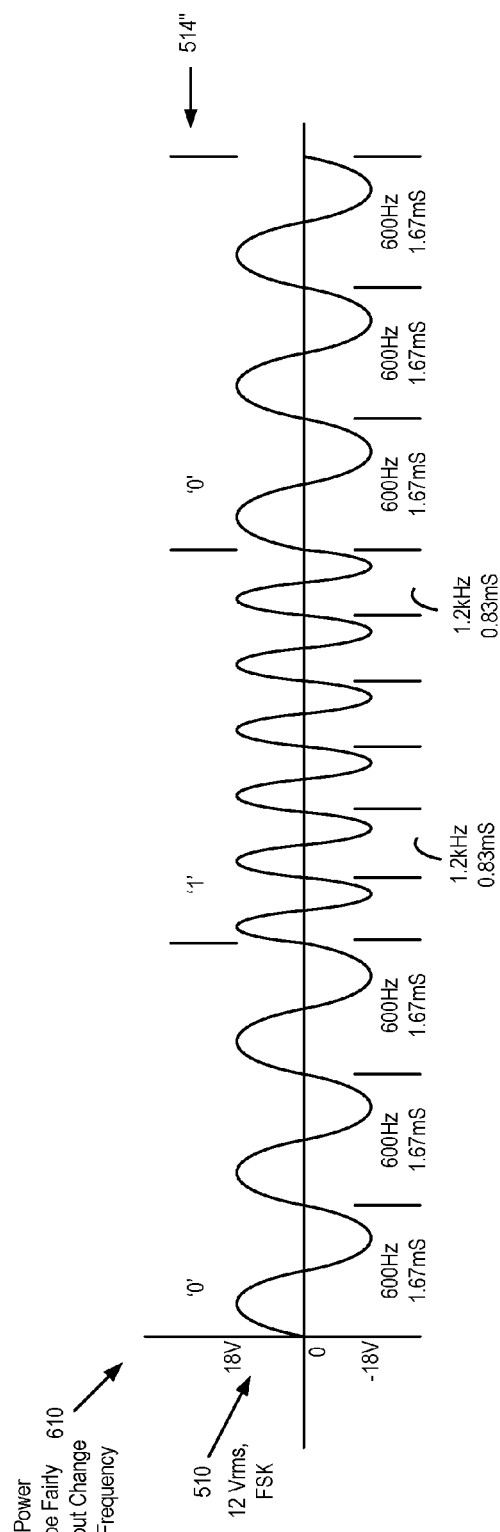
FIG. 6A
FIG. 6B

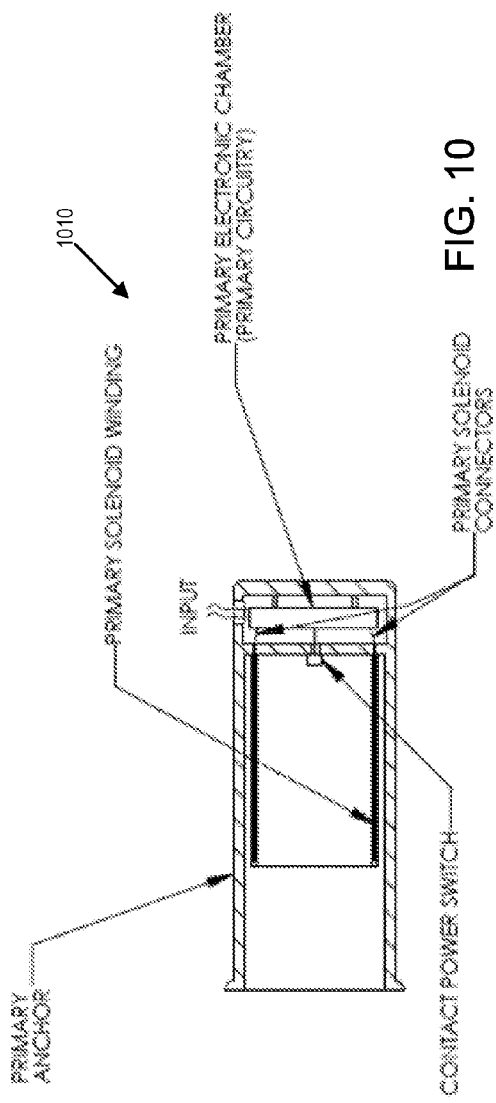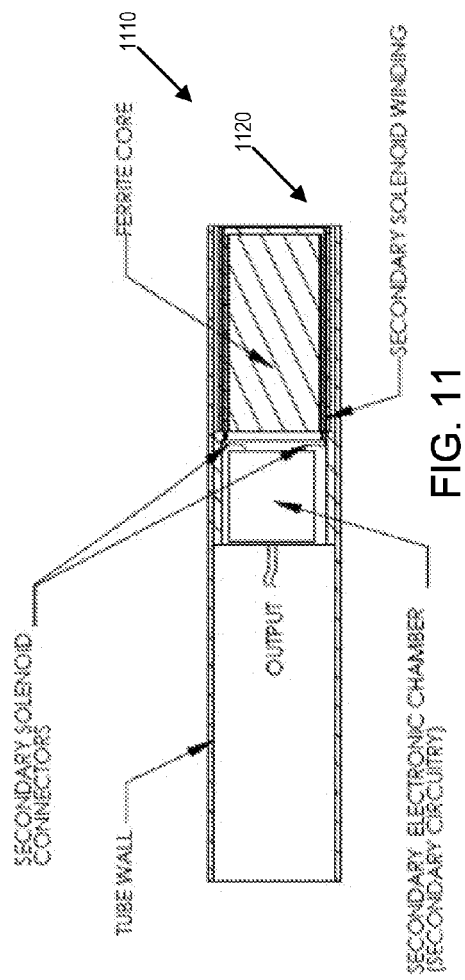

LIGHTING DEVICES EMPLOYING CLASS-E POWER AMPLIFIER FOR INDUCTIVE POWER AND DATA TRANSFER IN HIGH-MOISTURE OPERATING ENVIRONMENTS

RELATED APPLICATION

The present application claims benefit of U.S. Provisional Patent Application No. 62/155,239, filed Apr. 30, 2015, which is hereby incorporated by reference in its entirety.

TECHNICAL FIELD

This disclosure relates generally to lighting devices for swimming pools, water features, ponds, hot tubs, spas, and other high-moisture (i.e., humid, submerged, or wet) operating environments; and, more particularly, to lighting systems having electromagnetic inductive coupling for wireless (contactless) transfer of power and lighting-control commands to a light module controlling a light-emitting device, such as a light emitting diode (LED).

BACKGROUND INFORMATION

Some swimming pools, spas, and the like have included lighting systems incorporating inductive-coupling lighting components. For example, previous inductive-coupling underwater lighting attempts have included LED pool-wall light modules available from various companies, such as, Intex Recreation Corp., Shanghai Colin Semiconductor Lighting, and CCEI.

SUMMARY OF THE DISCLOSURE

An inductive-coupling lighting system for use in high-moisture operating environments provides electromagnetic inductive coupling for simultaneous wireless (contactless) transfer of power and lighting-control commands. According to one embodiment, the system includes a light-module receptacle providing a socket by which to mechanically receive a light module (e.g., a luminaire) that plugs into the socket. The light module includes a male inductive coupler that inductively couples with a female inductive coupler of the receptacle. The lighting system, therefore, has no electrical contacts exposed to moisture, and neither male nor female inductive couplers needs to be opened to replace a lamp. The lamp can instead be replaced by swapping light modules, even while the receptacle is energized in a wet (i.e., underwater) operating environment, and while the receptacle is deployed in a pool occupied by people.

The receptacle receives its electrical power through waterproof cabling from a conventional power source. Received power is then wirelessly transmitted to the light module. Thus, the lighting system of the present disclosure enables the light module to wirelessly receive electrical power and signals provided by a conventional power supply cord that is electrically coupled to the female inductive coupler installed, e.g., underwater. Accordingly, the disclosed lighting system may use, without modification, existing hardwired power supply infrastructure including underground wiring and conduit installations that have been used previously for conventional swimming pool lighting systems. In other words, the lighting system may be used to retrofit existing lighting systems without replacing underground wiring.

Because the system may be used for retrofit installations, it is also capable of interpreting and translating various types of lighting-control signals received from existing lighting controllers that modulate input power signals according to lighting-control command information intended to change an illumination state (e.g., color, brightness, pattern, dynamic behavior, or other states) of the lighting system. Accordingly, the receptacle includes internal electrical circuitry, such as a class-E power amplifier, for converting a relatively low voltage, alternating current (AC) source of power and lighting-control signals into a high-frequency sinusoidal AC waveform for transferring power wirelessly by inductive coupling—i.e., without electrical contacts between an LED of the light module and the receptacle— and while simultaneously carrying modulated lighting-control command information to a controller of the light module. The high-frequency sinusoidal AC waveform is generated by rapid switching of a switching device (e.g., power MOSFET transistor) of the class-E power amplifier. The class-E power amplifier is switched according to a digital switching signal nominally corresponding to a high-speed duty signal. Thus, commands are modulated by using the switching device to, in response to the digital switching signal, convert direct current (DC) input power to the high-frequency sinusoidal AC waveform applied to a primary solenoid of the female inductive coupler that induces a voltage in—and carries power and command information to—the male inductive coupler of the light module.

According to some embodiments, the command information may represent iStar™, power-cycling, or other types of lighting-control commands. Thus, in some embodiments, the command information represents iStar™ lighting-control commands signaled through frequency-shift keying frequency modulation of the source of input power. In other embodiments, the source of input power has a predetermined sequence of temporal gaps collectively representing power-cycling lighting-control commands (i.e., rapid on/off toggling at predetermined intervals). In other words, the command information is represented by a sequence of low (or no) power and full (or average) power delivered by the source of input power.

In some embodiments, transmission periods of the high-frequency sinusoidal AC waveform follow a predetermined on/off sequence and thereby indicate that the power has been toggled. (The toggling conveys the command information, as noted previously.) In other embodiments, the command information is encoded according to a Manchester encoding of it with the high-speed duty (e.g., clock) signal. In yet other embodiments, the receptacle itself may translate a first type of lighting-control command protocol (e.g., power-cycling) received from the source of input power into a second type of lighting-control command protocol (e.g., iStar™) communicated to the light module, and vice versa. For example, power-cycling commands may be used to start and stop the excitation waveform, or they may be encoded by Manchester encoding of the power-cycling command information, or they may be encoded by translating them from power-cycling command information to corresponding iStar™ command information that is then Manchester encoded to establish the digital switching signal.

Additional aspects and advantages will be apparent from the following detailed description of embodiments, which proceeds with reference to the accompanying drawings.

BRIEF DESCRIPTION OF THE DRAWINGS

FIGS. 6A and 6B are annotated timing diagrams of, respectively, power-cycling and iStar™ lighting-control signals representing lighting-control commands.

FIG. 10 is a cross-sectional view of the light-module receptacle of FIG. 9.

FIG. 11 is a cross-sectional view of the light module of FIG. 9.

DETAILED DESCRIPTION OF EMBODIMENTS

In contrast to lighting systems using hardwired electrical power transfer for delivering power to light-producing devices, underwater lighting systems using inductive coupling have been recognized as reducing risk of shock (or electrocution), and as being less susceptible to electrical faults or other short circuit conditions. For example, a direct power connection may cause electrical shock when a pool light or pool-facing light housing is damaged and energized electrical components are exposed to the pool water. This presents a risk to human life, particularly when there is a wiring or safety device failure preventing a ground-fault circuit interrupter (GFCI) or a circuit breaker from automatically shutting off power in response to an electrical short circuit condition. Also, conventional hardwired underwater light configurations have lamps or LED assemblies that are inconvenient to service because servicing these components demands a dry environment. This means that when the lighting devices are underwater, the water level is first dropped—or the lights are brought up onto a dry surface deck above the water level—before the devices are serviced. Thus, servicing these hardwired lights becomes labor intensive and potentially wasteful of water. Despite the aforementioned drawbacks, however, hardwired electrical power transfer systems operating at relatively low voltage (e.g., 12 volts) or at regular line voltage (e.g., 120 volts) are still found in many existing pool lighting installations commonly deployed in in-ground swimming pool walls and in surrounding decks.

Some more recent pools, spas, and the like include lighting systems having inductive-coupling lighting modules. But these modules are each individually paired with a dedicated power supply, and each vendor's lighting system uses its own proprietary, dedicated power supplies. These power supplies generally operate at the line voltage alternating current (Vac) having a frequency range of about 50-60 hertz (Hz). This line voltage is then converted from its relatively low frequency to a moderately higher frequency used to transfer power to LED lights through electromagnetic induction.

The aforementioned proprietary power supplies do not fit within existing underground power cord conduit runs, and therefore cannot be readily used to retrofit existing hardwired infrastructure with inductive-coupling systems. And installing numerous new dedicated power supplies is impractical and resource inefficient—particularly so in cases where existing hardwired infrastructure is available. Furthermore, the prior inductive-coupling lighting systems are not capable of providing power-cycling (i.e., toggling on/off according to a predetermined timing) lighting-control command protocols, as described in U.S. Patent Application Publication No. 2008/0297068, or the iStar™ lighting-control command protocols that are the subject of U.S. Patent Application Publication No. 2014/0203710.

Figure 1:
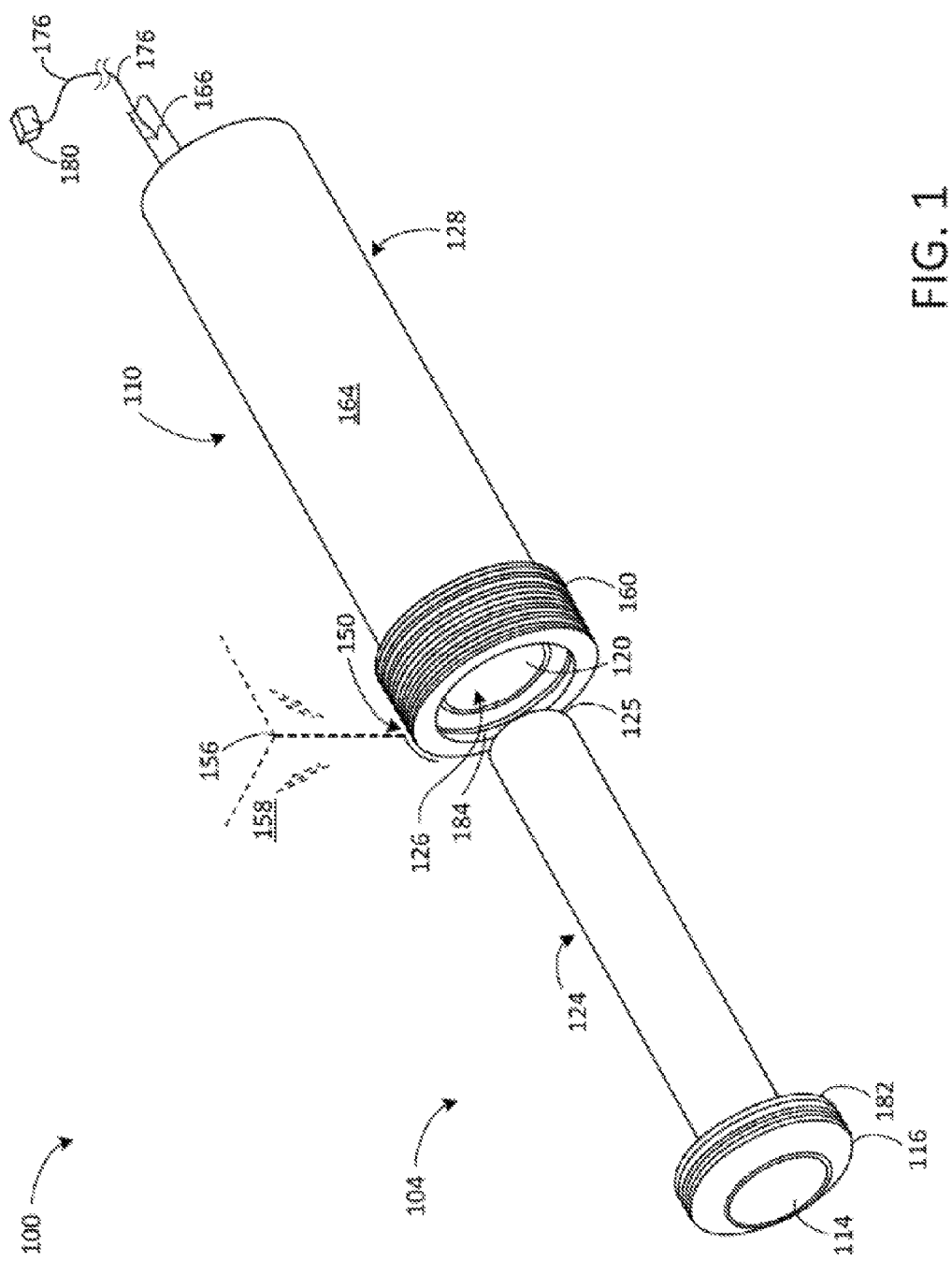
FIG. 1 is an isometric view of an inductive-coupling lighting system including a light module spaced apart and longitudinally aligned with a light-module receptacle for insertion of a male inductive coupler into an opening of a female inductive coupler, according to one embodiment.

FIG. 1 shows an inductive-coupling lighting system 100 of the present disclosure having a detachable light module 104 spaced apart from and axially aligned with a light-module receptacle 110. The light module 104 and the receptacle 110 are oriented such that a transparent (or translucent) diffuser lens 114 at an illuminable end 116 of the light module 104 faces away from an opening 120 of the receptacle 110 for insertion of a male (wireless receiver) inductive coupler 124 distal end 125 of the light module 104 through the opening 120 and into a cylindrical cavity 126 having a diameter and length sized to encompass the coupler 124 inside a female (wireless transmitter) inductive coupler 128 of the receptacle 110.

As an aside, it is noted that the term inductive coupler refers specifically to a section of the lighting system 100 capable of maintaining electromagnetic induction, e.g., resonant inductive coupling. The term, however, is also used in this document as a way of referring generally to the (mechanically) mateable and inductively operable sections of the male and female modules, and their respective internal electrical circuitry components therein.

The receptacle 110, as shown in FIG. 1, is embedded within a lighting recess 150 formed in a swimming pool wall 156. The wall 156 has an exposed surface 158 that is ordinarily exposed to water or moisture. Therefore, annular gaskets 160 near the opening 120 form a seal between the recess 150 and an outer surface 164 of the coupler 128 (when it is placed inside the recess 150) so as to inhibit water or moisture intrusion from leaking past the exposed surface 158 and reaching preinstalled electrical infrastructure including an electrical conduit 166 encompassing a wire 176. The wire 176, which may carry a low 12 Vac, 12 volts root mean square (12 Vrms) or line voltage (120 Vac) of a conventional hardwired system, electrically connects the coupler 128 to a remotely located power supply 180 that delivers electrical power and lighting-control signals to the coupler 128.

The aforementioned sources of input power are typical because existing lighting-control systems (such as, for example, those of Pentair plc, Hayward Industries Inc., and SAVI Pool and Spa) provide these voltage levels through underground power cords to lights installed on the swimming pool. And iStar™ controllers transfer 12 Vrms to the light. Therefore, for retrofitting, the lighting system 100 of the present disclosure may operate at such voltages so that the primary coupler works directly with these existing control systems without further signal or wiring changes.

The light module 104 has no externally exposed electrical connectors or contact wires so that its threaded end 182 need not form a completely watertight seal when screwed into corresponding threads 184 about the opening 120 (when the male inductive coupler 124 is mated with the female inductive coupler 128). Thus, the light module 104 may be readily and safely removed while submerged underwater so as to facilitate replacement of an underwater light in a wet operating environment, i.e., without draining water from a swimming pool.

Figure 2:
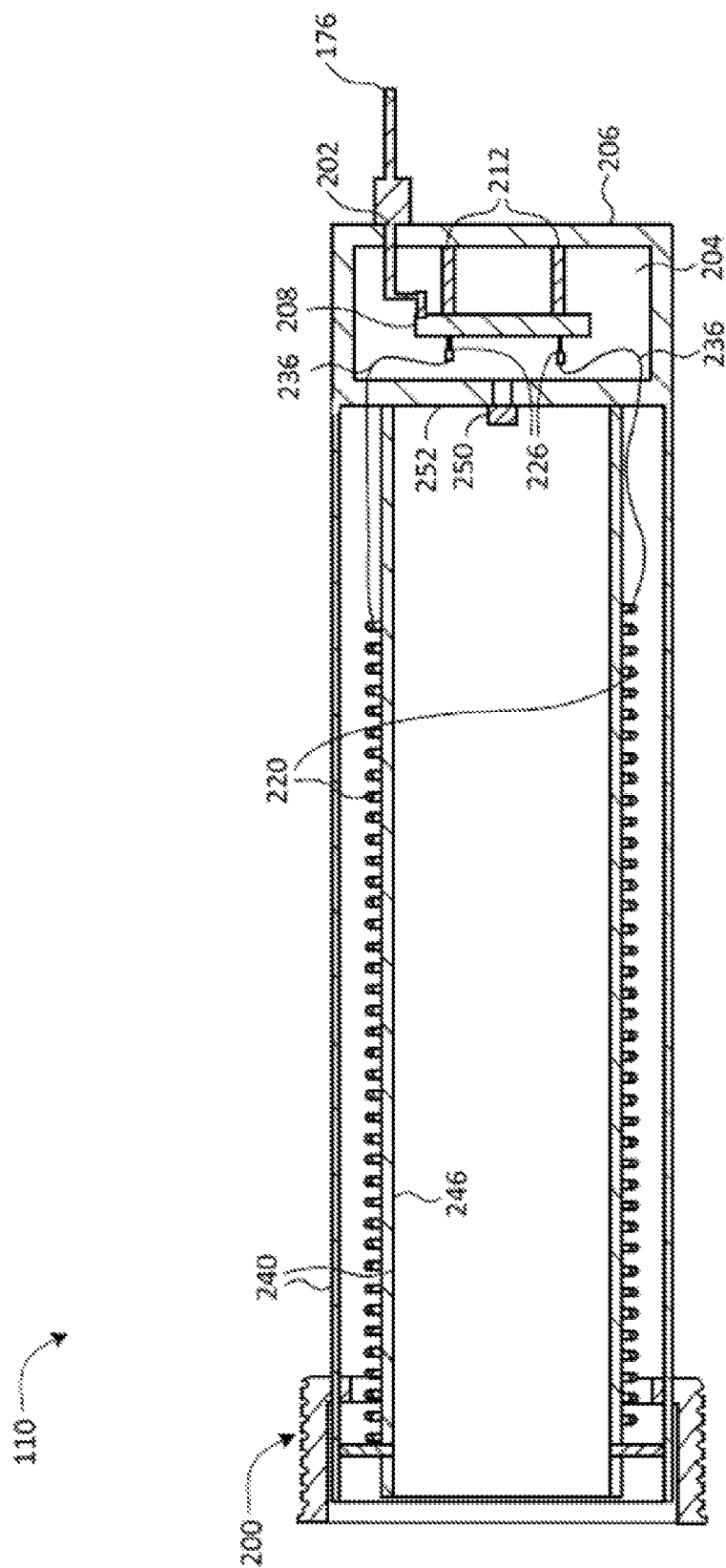
FIG. 2 is a cross-sectional view of the light-module receptacle of FIG. 1, showing a primary coil and associated electrical circuitry of the female inductive coupler.

FIG. 2 shows the wire 176 entering a housing 200 of the receptacle 110 through a watertight power inlet port 202 and into an internal electronics area 204 located proximal a base 206 of the coupler 128. The electronics area 204 contains a primary printed circuit board assembly (PCBA) 208 having electrical circuitry (see, e.g., FIGS. 5, 7, and 8) for controlling power and lighting-control commands transmitted by the coupler 128 to the coupler 124 when the coupler 128 is electrified and serving as an in-wall excitation fixture.

The primary PCBA 208 is securely mounted and heat-sinked by mounting posts 212. The primary PCBA 208 supplies power and lighting-control commands to a primary solenoid 220 that includes a cylindrically wound coil of electrically conductive wire. Electrical contacts 226 extend from the primary PCBA 208 for securely connecting the primary PCBA 208 to the primary solenoid 220 via one or more wire leads 236.

The primary solenoid 220 is encapsulated by a polymeric material 240 so that it is sealed from water or moisture. For example, the primary solenoid 220 coil wire is wrapped multiple times around an inner polymeric casing 246. Accordingly, when the primary solenoid 220 is powered, it establishes an electromagnetic field within the cylindrical cavity 126.

A push-bottom single pole mechanical contact switch 250 located at a bottom wall 252 of the cylindrical cavity 126 faces the opening 120 so as to provide an interlock switch to turn on (or off) power to the coupler 128. The contact switch 250 defaults to open (no power), and closes the power circuit (power on) when depressed by the distal end 125 of the light module 104. By defaulting to an open circuit, the contact switch 250 reduces excess power consumption and provides a layer of protection from major physical damage and electrical shock. For example, the contact switch 250 cuts off power to the coupler 128 in the event of a major physical event that might be sufficiently severe that it deforms the structure and dislodges the light module 104.

In one embodiment, the contact switch 250 stops all of the electrical components of the primary PCBA 208 from drawing power from the wire 176, so that when the contact switch 250 is open, none of the electrical components within the coupler 128 is energized. In another embodiment, the contact switch 250 stops the primary solenoid 220 from drawing power while allowing other components of the primary PCBA 208 to remain in a powered state. Other types of switches, including magnetic switches, may be used as well for these purposes.

Figure 3:
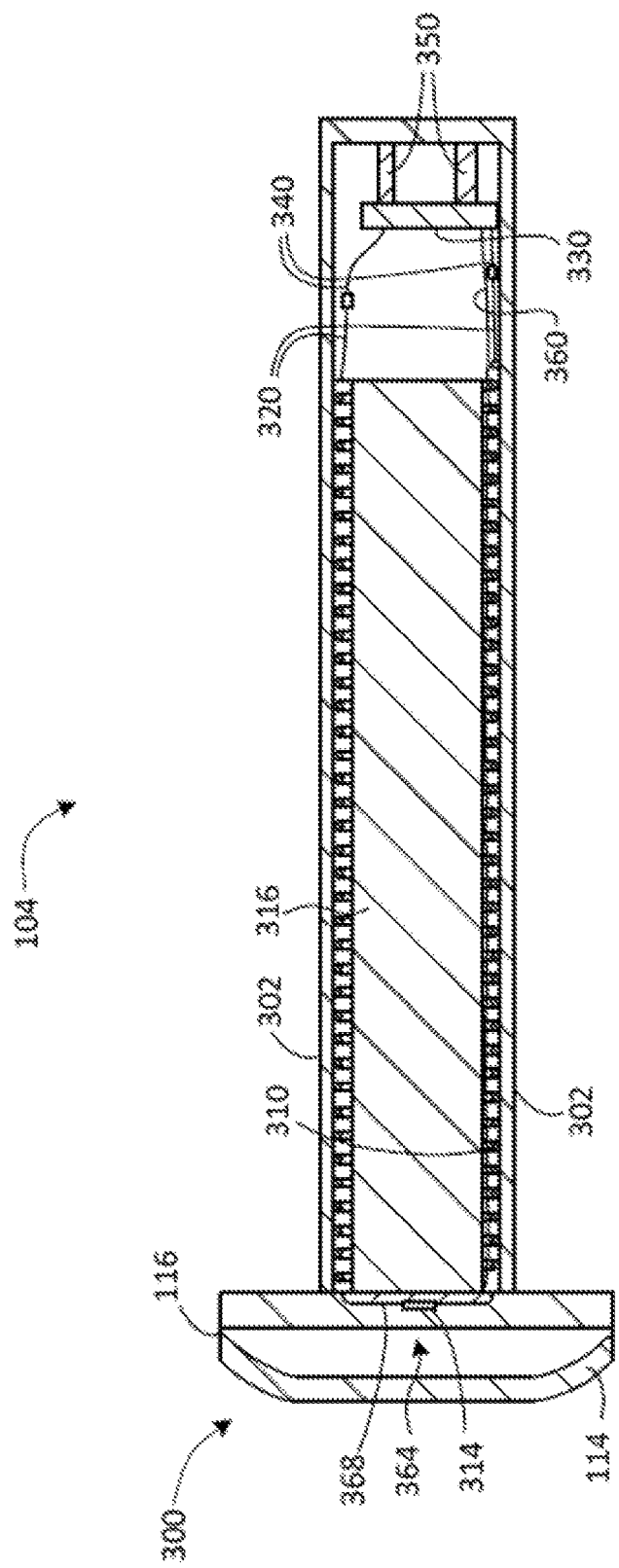
FIG. 3 is a cross-sectional view of the light module of FIG. 1, showing a secondary coil and associated electrical circuitry of the male inductive coupler.

FIG. 3 shows the light module 104 having a housing 300, which is watertight and sheathed by a cylindrical polymeric cover 302. When the light module 104 is deployed in the receptacle 110, and the lighting system 100 is in operation and illuminating a pool, a secondary solenoid 310 of the light module 104 transforms the magnetic field generated by the primary solenoid 220 into electrical current, thereby providing power and lighting-control commands to electrical components of the light module 104, including lighting devices 314.

The secondary solenoid 310 includes a coil of electrically conductive wire wrapped multiple times around a cylindrical ferrite core 316, which strengthens the magnetic field generated by the primary solenoid 220 and improves the efficiency of the wireless, inductive energy transfer between the primary solenoid 220 and the secondary solenoid 310.

Electrical current induced in the secondary solenoid 310 flows through conductive leads 320 to a secondary PCBA 330. The secondary PCBA 330 includes electrical circuitry that receives induced power and, when applicable, demodulates lighting-control commands. The secondary PCBA 330 regulates the received waveform from a sinusoidal waveform used for efficient energy transfer across the inductive coupling to a DC voltage and pulse-width modulated signal suitable for powering electronics and controlling the lighting devices 314. Contact posts 340 enable secure connection of the leads 320 to the secondary PCBA 330, and a secure mount and heat-sink are provided for the secondary PCBA 330 by mounting posts 350.

A signal wire 360 provides power and pulse-width modulated LED driver signals (based on demodulated lighting-control commands) from the secondary PCBA 330 to the lighting devices 314. The lighting devices 314, which may include one or more discrete LED components 364, are installed on an aluminum printed circuit board (PCB) 368 that physically contacts the core 316 so as to facilitate heat conduction away from the LED components 364, through the aluminum PCB 368, and into the core 316.

Figure 4:
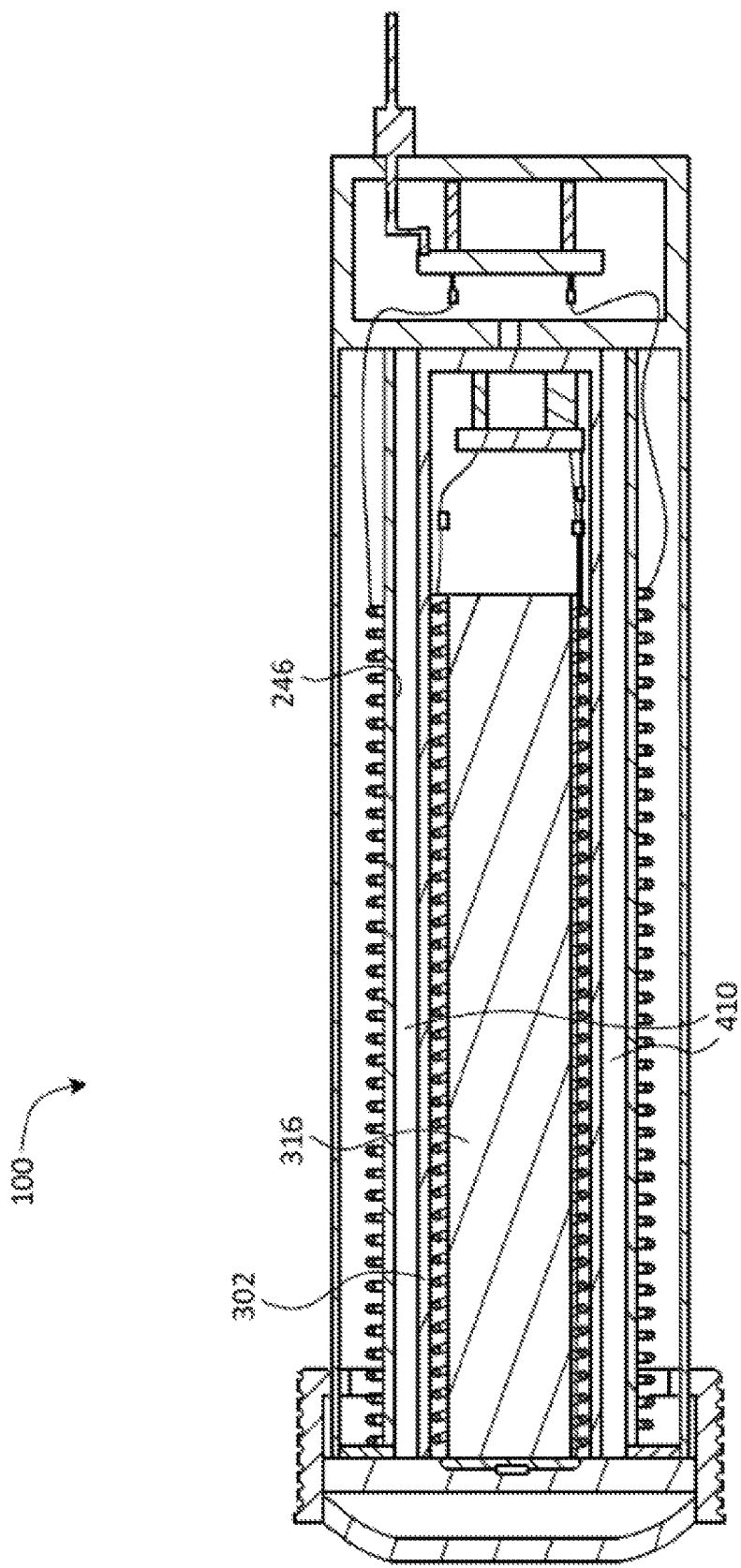
FIG. 4 is a cross-sectional view of the inductive-coupling lighting system of FIG. 1 when the male inductive coupler is mated with the female inductive coupler.

FIG. 4 shows the light module 104 installed in the receptacle 110. Notably, the distal end 125 of the male inductive coupler 124 has depressed the contact switch 250, closing the power circuit, and thereby energizing the female inductive coupler 128. A substantially uniform gap 410 in the cylindrical cavity 126, between the cover 302 and the inner polymeric casing 246, allows water in the cylindrical cavity 126 to be displaced by the male inductive coupler 124 when it is mated with the female inductive coupler 128. The uniformity of the gap 410 and the complete overlapping of the male inductive coupler 124 (i.e., the core 316) by the female inductive coupler 128 provide for improved power transfer efficiency.

Figure 5:
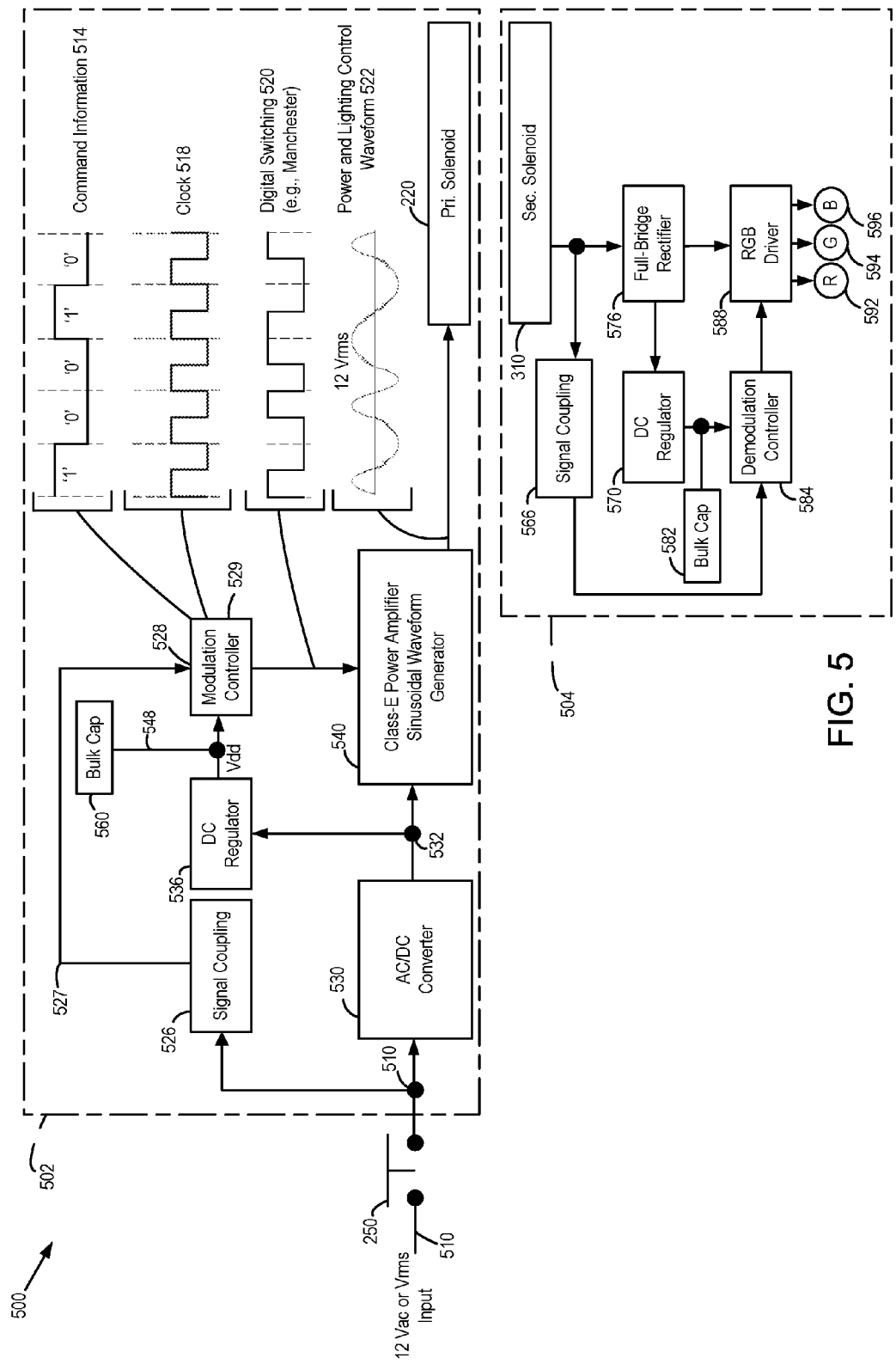
FIG. 5 is a block diagram of the internal electrical circuitry of a light module and light-module receptacle, and including example timing diagrams of command information, clock, a digital switching signal that is a Manchester-encoded version of the command information, and a modulated waveform based on the Manchester-encoded version of the command information.

FIG. 5 shows electrical components 500 for wirelessly transferring both power and lighting-control commands from the primary solenoid 220 to the secondary solenoid 310. The components 500 are summarized in the following two paragraphs that provide an overview of two supported operational states: a dynamic state, during which lighting-control commands are transmitted, and a steady state, during which no commands are transmitted. Following this summary, components 502 of the receptacle 110 are described in detail, and then components 504 of the light module 104 are described in detail.

When passing a lighting-control command to the light module 104, the receptacle 110 receives a 12 Vac (or Vrms) sinusoidal waveform input power signal 510 (or simply, input power 510) of about 50-60 Hz that carries lighting-control signals modulating lighting-control commands using frequency-shift keying (FSK) frequency modulation (e.g., F/2F modulation), power-cycling, or other relatively low-frequency techniques. The underlying modulation scheme is detectable based on the frequency of the input power source, at which point the lighting-control signals, having generally sinusoidal waveforms, are used to derive command information 514. The command information 514 may be logically represented as binary sequence of data or a continuous digital signal, as shown in FIG. 5.

According to one embodiment, the command information 514 is encoded according to a relatively high nominal clock signal 518 having a frequency of about 240 kHz so as to produce a rapidly switching digital switching signal 520 facilitating high power-transfer efficiency. For example, the digital switching signal 520 represents the command information 514 encoded based on a Manchester encoding technique. In this encoding scheme, if an encoded signal has a high logic level at a first half of a clock period and has a low logic level at a latter half of the clock period, the transition between logic levels is interpreted at a receiver as a binary "1." Conversely, if the encoded signal has a low logic level at the first half of the clock period and a high logic level at the latter half of the clock period, the transition is interpreted as a binary "0."

According to another embodiment, the command information 514 is used to toggle on and off the digital switching signal 520. During the "on" portions, the digital switching signal 520 is the clock signal 518. During the "off" portions, the digital switching signal 520 is off so that no power is transferred wirelessly.

The digital switching signal 520 is used to produce a 12 Vrms sinusoidal voltage signal 522. The sinusoidal voltage signal 522 is applied to the primary solenoid 220 to establish an oscillating electromagnetic field for power transfer to the secondary solenoid 310. In this way, the sinusoidal voltage signal 522 provides for inductive power transfer while simultaneously modulating lighting-control commands using, e.g., power-cycling or FSK modulation.

For example, with power-cycled commands 600 (FIG. 6A), changes in input power represent the command information 514'. Accordingly, when power (voltage) is sensed, the digital switching signal 520 is a pulse train at the pulse repetition rate of 240 kHz. When power is low or not sensed, the digital switching signal 520 is off or otherwise inhibits wireless energy transfer.

In another example, with case of FSK-modulated commands 610 (FIG. 6B), changes in frequency represent the command information 514". As explained previously, the command information 514" may be Manchester encoded to form the digital switching signal 520. Then, the sinusoidal voltage signal 522 produced by the digital switching signal 520 follows that signal by temporally aligning positive and negative AC waveform peaks with corresponding high and low logic levels of the digital switching signal 520. Positive AC waveform peaks encode "high" logic levels, and negative AC waveform peaks encode "low" logic levels.

In yet other examples, power-cycling command information may be Manchester encoded, or FSK command information may be used for power-cycling the wireless energy transfer.

The following paragraphs describe additional details of the components 502, beginning from the 12 Vac (or Vrms) sinusoidal waveform input 510, and ending with the primary solenoid 220.

Receiving the input power 510 is a signal coupling circuitry 526. In general, the signal coupling circuitry 526 is used to reduce the voltage of the AC to a logic level suitable for sampling digitally. Specifically, the signal coupling circuitry 526 is used to obtain a lighting-control signal component of the input power 510 by converting (e.g., full- or half-wave rectifying and clamping) the input power 510 from 12 Vac or Vrms into voltage pulses communicated through a node 527 to an input port 528 of a lighting-command modulation controller 529 (e.g., a microcontroller) operating at a digital logic voltage level that is less than the voltage of the input power 510. In other words, the signal coupling circuitry 526 allows the controller 529 to interpret the 12 Vac sinusoidal waveform input 510 in terms of a suitable digital logic voltage level threshold. An example of a signal coupling module is provided in FIG. 7, discussed in later paragraphs.

Also receiving the input power 510 is an AC/DC (AC-to-DC) converter 530 used to establish a DC power source. In some embodiments, it is a switch-mode converter. This type of converter has strong immunity to noise attributable to frequency interference, and is capable of producing DC output voltages that are higher than, equal to, or lower than those of the input power 510. Since the voltage of the input power 510 is relatively low in some embodiments, the AC/DC converter 530 may be used to boost that voltage and establish a relatively high driving voltage for driving serial-connected LEDs in the light module 104, discussed later. In the present embodiment, however, the AC/DC converter 530 converts the input power 510 to a 12 Vdc voltage 532 provided to a DC voltage regulator 536 and a class-E power amplifier sinusoidal waveform generator 540.

The DC voltage regulator 536 is a linear, three-pin DC-to-DC regulator. The DC voltage regulator 536 produces an integrated circuit supply voltage (Vdd) 548 that is several volts lower than the 12 Vdc voltage 532. For example, the DC voltage regulator 536 provides 3.3 Vdc to the controller 529 and a bulk capacitor 560.

The supply voltage 548 is used to charge the bulk capacitor 560, which stores energy for powering the controller 529 during brief periods when power-cycling commands (see, e.g., 0.5 second periods of no input power shown in FIG. 6A) are being received at the input power 510 and would otherwise cause the controller 529 to lose power. For example, during 1.0 second and 0.5 second periods of the command information 514' for which no power is present at the input power 510, the bulk capacitor 560 provides power for the controller 529 so that the controller 529 is able to recognize and interpret the pattern (sequence, timing, or number) of power cycle on and off pulses used in power-cycling lighting-control command protocols.

Figure 8:
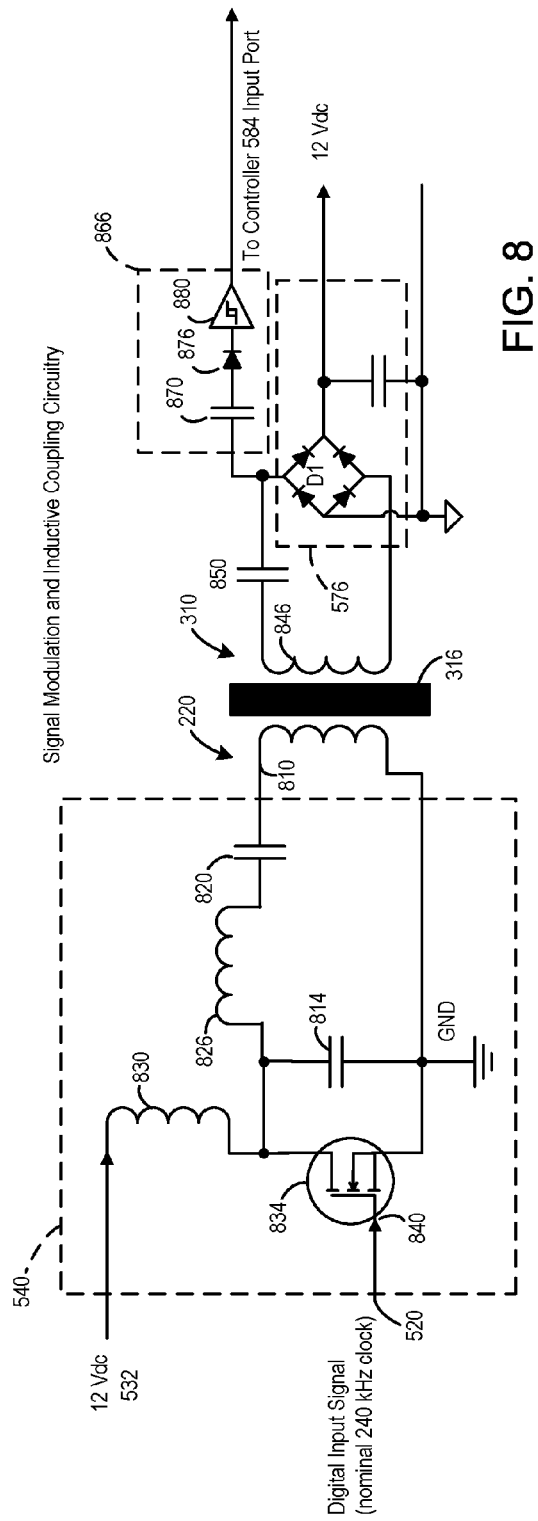
FIG. 8 is an electrical schematic diagram of a class-E power amplifier signal modulator, inductive coupling, and signal demodulator electrical circuitry of FIG. 5, according to one embodiment.

Lastly, for the components 502, the class-E power amplifier 540—an example of which is shown in FIG. 8—is used to convert the digital switching signal 520 generated from the controller 529 into the sinusoidal voltage signal 522. At the last stage of the components 502, the sinusoidal voltage signal 522 is applied to the primary solenoid 220 to generate the oscillating electromagnetic field.

The components 504 of the light module 104 generally perform the reverse operation as that performed by the components 502. For example, the components 504 include the secondary solenoid 310 to receive an induced voltage including transmitted power and lighting-control commands, a signal coupling circuitry 566 that is similar to the signal coupling circuitry 526, a DC regulator 570, a full-bridge rectifier 576 performing a function similar to that of the AC/DC converter 530, a bulk capacitor 582, and a lighting-control command demodulation controller 584 that also performs lighting specific operations.

Specifically, whereas the controller 529 generates the digital switching signal 520, the controller 584 instead derives (e.g., demodulates or decodes) its received signal to obtain the command information 514, translate the command information 514 to an associated lighting-control command, and generate corresponding output signals for controlling an LED driver, such as a red-green-blue (RGB) driver 588. The RGB driver 588 then uses the output signals for selectively activating at least one of a red LED 592, a green LED 594, a blue LED 596, or other illumination device. For example, in some embodiments, the controller 584 produces a pulse-width modulation signal to separately control color and brightness for each of the LEDs 592, 594, and 596, and the modulation signal is buffered by the RGB driver 588 and applied to the LEDs 592, 594, and 596. In other words, the controller 584 changes the duty cycles of the three channels of RGB applied to the LEDs 592, 594, and 596 so as to display the desired color or brightness.

Figure 7:
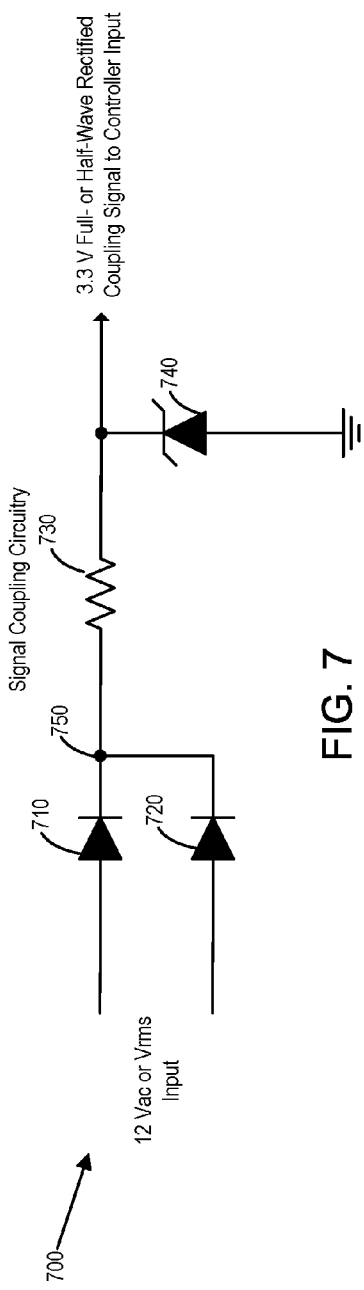
FIG. 7 is a fragment of an electrical schematic diagram showing electrical components of signal coupling circuitry of FIG. 5.

FIG. 7 shows an example electrical schematic diagram 700 of the signal coupling circuitry 526 and the signal coupling circuitry 566. The diagram 700 includes a first diode 710, a second diode 720, a current-limit resistor 730, and a Zener diode 740. The signal of the input power 510 flows through the first diode 710 and the second diode 720 for rectification at an output node 750. The resistor 730 limits the current, and the Zener diode 740 suppresses high voltages incompatible with digital logic voltage levels of the controller 529 or the controller 584.

FIG. 8 shows an inductive coil 810 that is the primary solenoid 220 working as a load for the class-E power amplifier 540. The class-E power amplifier 540 includes a capacitor 814, a capacitor 820, an inductor 826, an inductor 830, and a power transistor 834.

A gate terminal 840 of the transistor 834 is connected to the controller 529 (FIG. 5) output port so as to receive the digital switching signal 520 that rapidly switches the transistor 834 at a nominal rate of 240 kHz (when no commands are transmitted), according to an FSK modulation pattern (when iStar™ commands are transmitted), or according to another timing sequence (e.g., the timing sequence shown in FIG. 6A for power-cycling lighting-control commands).

Through inductive coupling, the sinusoidal voltage signal 522 is replicated in an inductive coil 846 that is the secondary solenoid 310. After an induced signal passes a coupling capacitor 850, it is rectified by the rectifier 576 that proves DC power for the light module 104. Also, FIG. 8 shows that the induced signal passes through another embodiment of signal coupling circuitry 866, which provides for functionality as described for the signal coupling circuitry 526 and 566, but includes a capacitor 870, a diode 876, and a Schmitt trigger integrated circuit 880.

Figure 9:
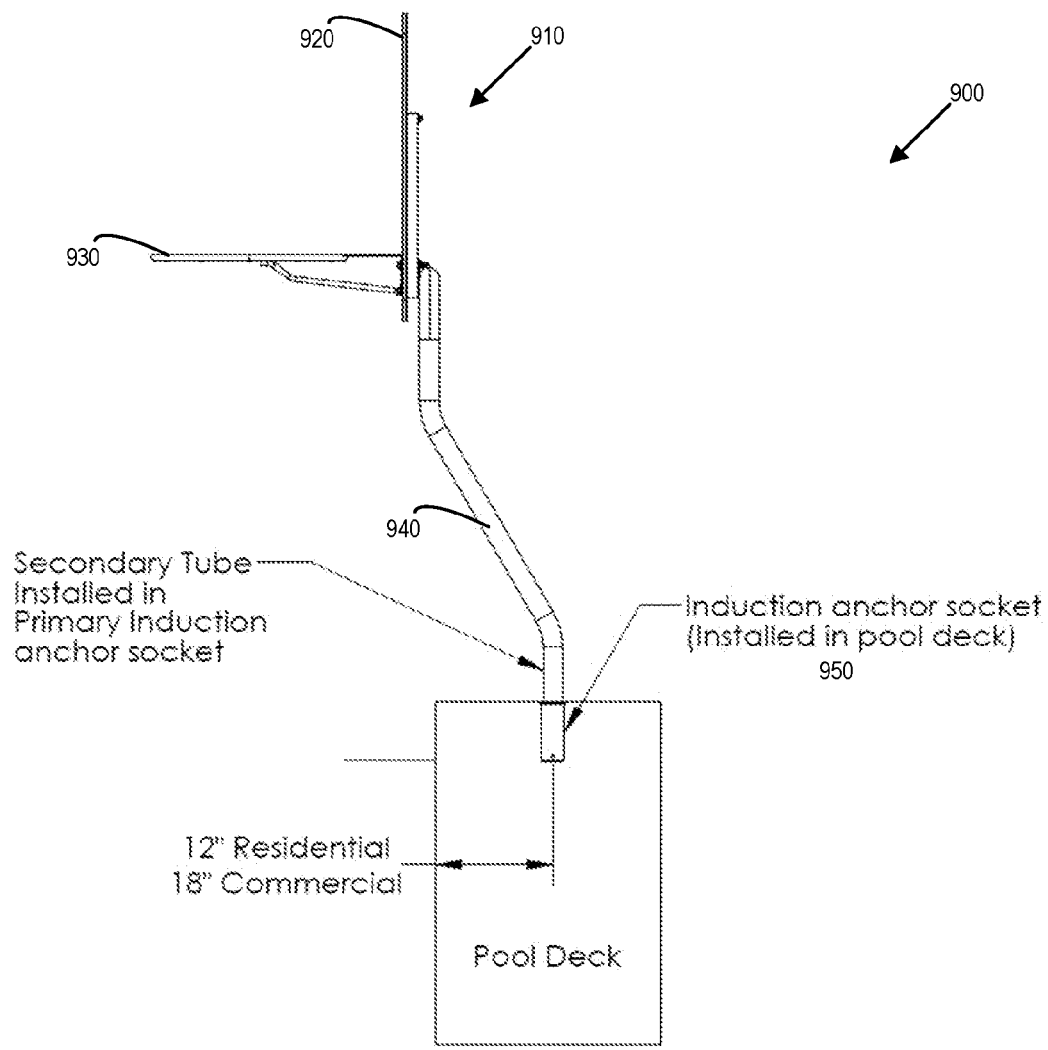
FIG. 9 is side elevation view of an inductive-coupling lighting system according to another embodiment including a light module in the form of an illuminated pool accessory and a light-module receptacle in the form of an anchor for a mast supporting the pool accessory.

FIGS. 9-12 show another embodiment of an inductive-coupling lighting system 900. With reference to FIG. 9, a light module 910 is shown in the form a pool accessory including an illuminated basketball backboard 920 that carries a basketball hoop 930 and is supported by a mast 940.

Figure 12:
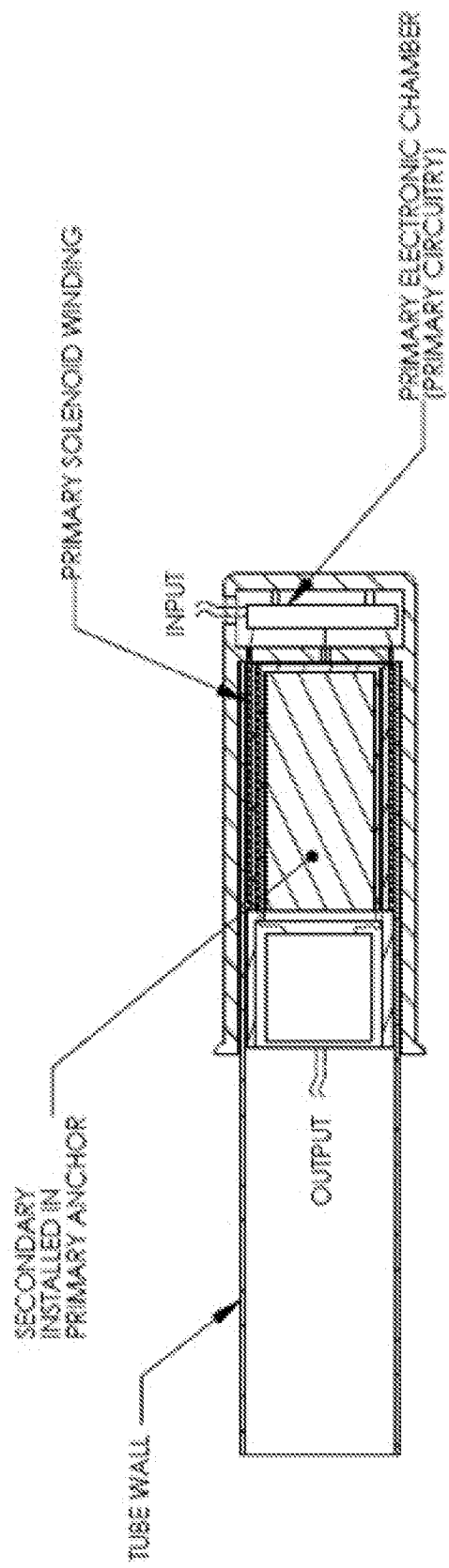
FIG. 12 is a cross-sectional view of the inductive-coupling lighting system of FIG. 9 in its mated condition.

In the system 900, a light-module receptacle 950 provides an anchor having a female inductive coupler 1010 (FIG. 10) that receives a male inductive coupler 1110 (FIG. 11) when a base 1120 is inserted into the female inductive coupler 1010. Thus, the base 1120 of the mast 940 includes the male inductive coupler 1110 that mates with the female inductive coupler 1010, as shown in FIG. 12. Power and lighting-control commands flow to the light module 910 as described previously. Also, the light module 910 may be in the form of other water-feature illuminated accessories.

Some of the infrastructure that can be used with embodiments disclosed herein is already available, such as general-purpose computers, computer programming tools and techniques, digital storage media, and communications networks. Various aspects of certain embodiments may be implemented using hardware, software, firmware, or a combination thereof. For example, a controller may refer to, be part of, or include an application specific integrated circuit (ASIC), an electronic circuit, and a processor (shared, dedicated, or group), and include memory (shared, dedicated, or group) that executes one or more software or firmware programs, a combinational logic circuit, or other suitable components that provide the described functionality. Specifically, the modulation controller 529 and the demodulation controller 584 may be implemented as embedded microcontrollers or other computing devices including a processor such as a microprocessor, microcontroller, logic circuitry, or the like. The computing device may include a computer-readable storage device such as non-volatile memory, static random access memory (RAM), dynamic RAM, read-only memory (ROM), disk, tape, magnetic memory, optical memory, flash memory, or another computer-readable storage medium that include instructions (or so-called software or firmware modules) that configure the computing device to preform logic operations such as comparing values and making logical determinations.

As used herein, a software or firmware module may include any type of computer instruction or computer executable code located within or on a non-transitory computer-readable storage medium. Such a module or component may, for instance, comprise one or more physical or logical blocks of computer instructions, which may be organized as a routine, program, object, component, data structure, etc., which performs one or more tasks or implements particular functions described in this disclosure. In certain embodiments, a particular module or component may comprise disparate instructions stored in different locations of a computer-readable storage medium, which together implement the described functionality of the module or component. Indeed, a module or component may comprise a single instruction or many instructions, and may be distributed over several different code segments, among different programs, and across several computer-readable storage media.

Skilled persons will understand that changes may be made to the details of the above-described embodiments without departing from the underlying inventive principles. The scope of the present invention should, therefore be determined only by the following claims.

The invention claimed is:

1. An inductive-coupling lighting system for use in a high-moisture operating environment, the inductive-coupling lighting system comprising:
  a light-module receptacle including a first inductive coupler and an input power connection through which the light-module receptacle receives an input power signal carrying a lighting-control signal representing command information, the first inductive coupler including a socket defined by a first watertight housing, a primary solenoid, a class-E power amplifier, a modulation controller, and associated electrical circuitry encompassed by the first watertight housing, the modulation controller configured to determine a type of the lighting-control signal and to produce a digital switching signal based on the command information, the digital switching signal, when applied to the class-E power amplifier, causing a switching device of the class-E power amplifier to switch and thereby generate a high-frequency sinusoidal waveform applied to the primary solenoid; and a light module including a second inductive coupler, light controller circuitry, and a light-emitting device, the second inductive coupler including a plug defined by a second watertight housing and sized to plug into the socket when the light module is in a mated condition with the light-module receptacle, the second watertight housing containing a secondary solenoid that, when in the mated condition and in response to application of the high-frequency sinusoidal waveform to the primary solenoid, provides an induced voltage simultaneously powering the light controller circuitry and signaling to it the command information by which change is made to an illumination state the light-emitting device.

2. The inductive-coupling lighting system of claim 1, in which the type of the lighting-control signal is a power-cycling type.

3. The inductive-coupling lighting system of claim 1, in which the type of the lighting-control signal is a frequency-shift keying type.

4. The inductive-coupling lighting system of claim 1, in which the modulation controller determines the type of the lighting-control signal based on a detected frequency of the input power signal.

5. The inductive-coupling lighting system of claim 1, in which the associated electrical circuitry includes signal coupling circuitry having an input and an output, and the output provides a coupling signal that depends at least in part on the lighting-control signal applied to the input.

6. The inductive-coupling lighting system of claim 5, in which the modulation controller includes an input port that receives the coupling signal having voltage levels compliant with thresholds of the input port.

7. The inductive-coupling lighting system of claim 5, in which the modulation controller samples the coupling signal to determine the type of lighting-control signal.

8. The inductive-coupling lighting system of claim 1, in which the modulation controller derives the command information based on at least one of gaps in received power or changes in frequency of the input power signal.

9. The inductive-coupling lighting system of claim 1, in which the modulation controller translates the command information from a first type of lighting-control protocol to a second type of lighting-control protocol.

10. The inductive-coupling lighting system of claim 1, in which the digital switching signal is a Manchester-encoded version of the command information encoded according to a high-speed clock signal.

11. The inductive-coupling lighting system of claim 1, in which the type of the lighting-control signal is a first type of lighting-control signal, the command information is a first type of command information representing the first type of lighting-control signal, and the digital switching signal is based on a second command information representing a second type of lighting-control signal that is different from the first type of lighting-control signal.

12. The inductive-coupling lighting system of claim 1, in which the switching device is a transistor and the digital switching signal switches the transistor to its off state in response to the modulation controller detecting a low logic level in the command information.

13. The inductive-coupling lighting system of claim 12, in which the type of the lighting-control signal is of an on/off sequence type, and the transistor is maintained in its off state during a period in which the low logic level is detected in the command information so that the primary solenoid induces no or low voltage during the period.

14. The inductive-coupling lighting system of claim 1, in which the type of the lighting-control signal is of a frequency-shift keying type, and in which a frequency of the digital switching signal modifies that of the high-frequency sinusoidal waveform based on the command information represented by the lighting-control signal.

15. The inductive-coupling lighting system of claim 1, in which the light module comprises a luminaire.

16. The inductive-coupling lighting system of claim 1, in which the light module comprises a water-feature illuminated accessory.

17. A light-module receptacle, comprising:
an input power connection through which the light-module receptacle receives an input power signal carrying a lighting-control signal representing command information; and
an inductive coupler including a socket defined by a watertight housing, a primary solenoid, a class-E power amplifier, a modulation controller, and associated electrical circuitry encompassed by the watertight housing, the modulation controller configured to:
determine a type of the lighting-control signal; and
produce, based on the command information, a digital switching signal that, when applied to the class-E power amplifier, causes a switching device of the class-E power amplifier to switch and thereby generate a high-frequency sinusoidal waveform applied to the primary solenoid to simultaneously transfer power and the command information to a light module.

18. A light module, comprising:
a light-emitting device;
light controller circuitry; and
an inductive coupler including a plug defined by a watertight housing and sized to plug into a socket of a light-module receptacle when the light module is in a mated condition with the light-module receptacle, the watertight housing containing a secondary solenoid that, when in the mated condition and in response to application of a high-frequency sinusoidal waveform to a primary solenoid of the light-module receptacle, provides an induced voltage simultaneously powering the light controller circuitry and signaling to it command information by which change is made to an illumination state the light-emitting device.

19. The light module of claim 17, in which the switching device is a transistor and the digital switching signal switches the transistor to its off state in response to the modulation controller detecting a low logic level in the command information.

20. The light module of claim 18, in which the high-frequency sinusoidal waveform is modulated based on the command information.

* * * * *

UNITED STATES PATENT AND TRADEMARK OFFICE
CERTIFICATE OF CORRECTION

PATENT NO.        : 9,544,964 B2
APPLICATION NO.   : 15/143381
DATED             : January 10, 2017
INVENTOR(S)       : Li It is certified that error appears in the above-identified patent and that said Letters Patent is hereby corrected as shown below:

In the Specification

Column 1
Line 48, change "needs" to --need--.

Column 7
Line 8, insert --a-- after "as".

Column 9
Line 55, insert --of-- after "form".

Column 11
Line 17, insert --of-- after "state".

Column 12
Line 52, insert --of-- after "state".

Signed and Sealed this
Eleventh Day of April, 2017

Michelle K. Lee
*Director of the United States Patent and Trademark Office*